Figure 1:
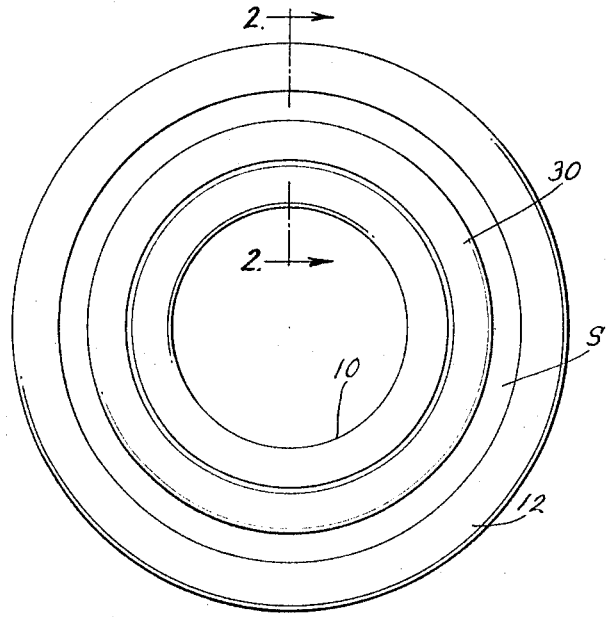

Sept. 13, 1966 B. A. TASSONE ET AL 3,272,574

SEAL FOR BEARINGS

Filed Feb. 10, 1964

INVENTORS:
BRUNO A. TASSONE
JOHN L. BLAKE, JR.

BY Howson & Howson

ATTYS.

3,272,574
SEAL FOR BEARINGS
Bruno A. Tassone, Philadelphia, and John L. Blake, Jr., Willow Grove, Pa., assignors to SKF Industries, Inc., King of Prussia, Pa., a corporation of Pennsylvania
Filed Feb. 10, 1964, Ser. No. 343,789
2 Claims. (Cl. 308—187.2)

The present invention relates to a sealing device for sealing the interstice between spaced confronting surfaces of a pair of relatively rotatable members such as the inner and outer rings of a bearing assembly.

A supply of lubricant is usually provided in the annular space between the inner and outer rings of a bearing assembly wherein the rolling elements are housed to lubricate the contacting elements of the bearing assembly. In order to retain the lubricant in the annular space, seals are usually provided adjacent the outer axial ends of the annular space between the rings. Some prior bearing seals used for this purpose consist of a ring-like member made of a resilient material such as plastic or rubber which seats along its outer peripheral edge in a groove in the outer ring and which has a flexible lip at its inner edge which lightly engages the outer surface of the inner ring. This type of seal is very easy to install and replace when necessary.

While these prior seals are generally satisfactory for the purpose intended; namely, to retain the lubricant in the annular space, nevertheless over a period of normal use some lubricant does tend to purge or leak by the seal. A number of factors contribute to this leakage, the major one being the normal wear of the flexible lip of the seal over a period of normal use. Leakage of lubricant from the bearing can in some instances present a problem. For example, in food processing machinery, there is a possibility of lubricant leaking past the seal being thrown off by the inner ring and contacting the food product being handled or processed resulting in contamination thereof. In other applications, leakage of lubricant can also be harmful. For example, in a clutch assembly if lubricant purges past the seal lip of one of the bearings of the clutch assembly and is thrown off to either the clutch plates or slip rings, the clutch would not operate satisfactorily.

The present invention provides a seal for bearing assemblies characterized by novel features of construction and arrangement which is designed to remedy the problems of lubricant leakage in an effective manner. To this end, the seal comprises a disc-like casing which may be made of a resilient material which along its outer peripheral edge is detachably engaged in a groove in the outer ring and engages along its opposite inner edge the peripheral surface of the inner ring, and a lubricant retaining member integrally connected to the inner and outer casing and including in the present instance offset radial wall portions connected by an axially extending wall portion. In the present instance, the outer radial wall portion of the lubricant retaining member is embedded in the seal casing and the axial wall portion and inner radial portion project from the front face of the casing to define with a portion of the casing an open circumferentially extending chamber, the open side of which faces radially inwardly and extends beyond the outer axial face of the inner ring of the bearing.

By this construction, lubricant which purges or leaks beyond the flexible lip of the casing and travels along the outer surface of the inner ring is thrown off by centrifugal force and deposited in the lubricant retaining member. Thus, in applications where lubricant leakage to components of apparatus or machine in which the bearing assembly functions would create a critical problem, the seal of the present invention while not eliminating such leakage does tend to localize it so that it is not discharged or thrown off to these other components.

It is accordingly an object of the present invention to provide a seal for a bearing assembly characterized by novel features of construction and arrangement providing a novel and effective means for preventing lubricant which escapes from the bearing assembly from being thrown off or contacting elements other than the bearing assembly during operation.

Another object of the present invention is to provide an integral seal assembly which is of comparatively simplified construction and may be manufactured easily and economically.

A further object of the present invention is to provide a seal for bearings or the like which is easy to install and remove thereby facilitating assembly of the entire bearing.

Figure 2:
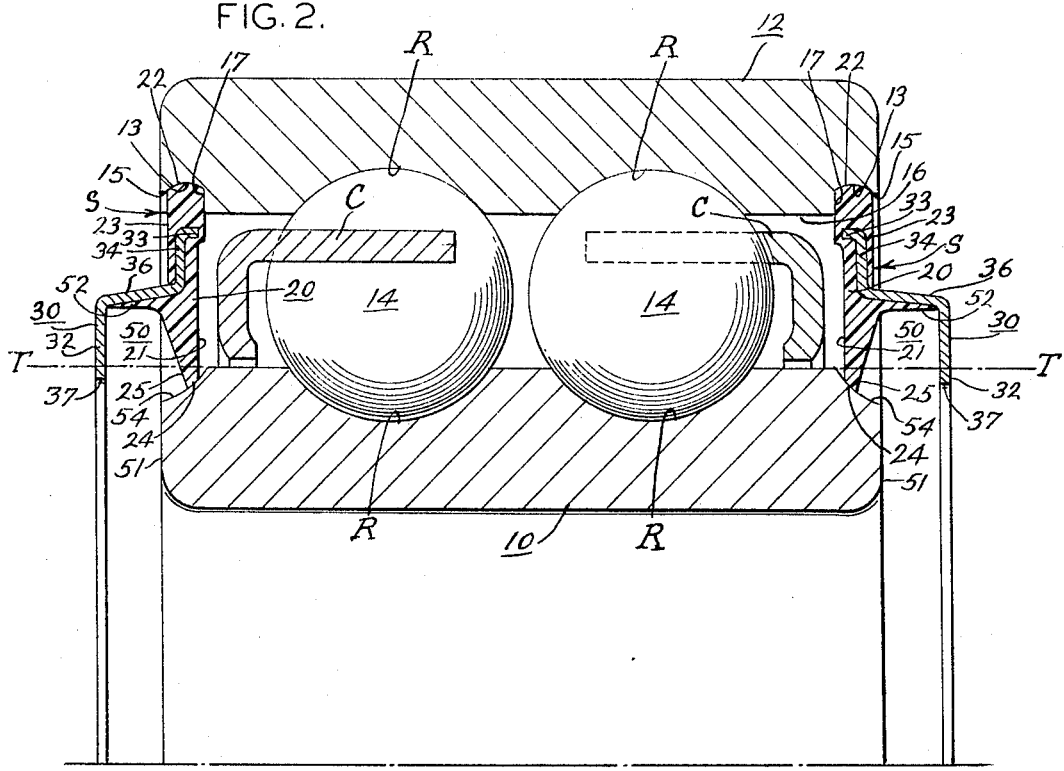

These and other objects of the present invention and the various features and details of the construction and use thereof are more fully set forth hereinafter with reference to the accompanying drawings, in which:

FIG. 1 is a side elevational view of a bearing assembly incorporating a seal constructed in accordance with the present invention; and FIG. 2 is an enlarged fragmentary sectional view taken on lines 2—2 of FIG. 1.

Referring now to the drawing, there is shown a bearing assembly comprising radially spaced inner and outer rings 10 and 12 respectively having the usual raceways R therein to support and guide a plurality of rolling elements 14 in the annular space 16 between the inner and outer rings. In the present instance, the rolling elements 14 are balls and the bearing assembly is a double row angular contact assembly having two rows of balls with conventional cages C for spacing the balls. A seal S is provided at opposite axial ends of the annular space 16 to retain lubricant in the space. To this end a circumferential locking groove 13 is provided at opposite axial ends of the outer ring 12 which groove 13 is disposed between a radially inwardly projecting lip 15 and a radially extending shoulder 17. The diameter of the opening provided by the lip 15 is smaller than the diameter of the groove 13 and greater than the inner peripheral edge of the wall or shoulder 17 of the outer ring.

In accordance with the present invention, the seal S is characterized by novel features of construction and arrangement providing ease of assembly to the bearing assembly and also is designed to catch lubricant which might leak from the bearing assembly and prevent it from being thrown off to other components with which the bearing assembly cooperates. To this end, as illustrated, the seal S includes a ring-like casing or body portion 20 made of a resilient, flexible material, for example rubber and having a substantially flat radial inner face 21, and an outer face 23. The casing 20 has a rounded outer peripheral edge 22 and is tapered toward its inner peripheral edge to provide a flexible feathered inner edge portion 25 which is also tapered as at 24.

The seal S further includes a lubricant retaining member 30 which may be made for example of metal and which in the present instance includes circumferentially extending offset inner and outer radial wall portions 32 and 34 respectively connected by a generally axially extending wall portion 36. In the present instance the outer radial wall portion 34 of the lubricant retaining member 30 is embedded in the casing 20 and has a short axial leg 33 projecting from its peripheral edge remote from the axial wall portion 36, the wall portion 34 serving as a stiffener for the casing 20. The axial wall portion 36 projects from the outer face 23 of the casing 20 approximately centrally thereof and the inner radial wall portion 34 which depends radially inwardly from the outer edge of the axial wall portion is of a radial depth so that its inner peripheral edge 37 lies in about the same circular plane as the feathered edge 24 of the casing 20. By this arrangement, in the assembled bearing the inner radial wall portion 32, axial wall portion 36 and lower half of the casing 20 defines a cup-like circumferential chamber 50 of U-shaped cross section (see FIG. 2), the open side of which overlies and confronts the outer axial end face 51 of the inner ring 10 of the bearing.

The lubricant retaining member 30 and casing 20 may be formed by conventional molding process to provide the integral construction. It is noted that in the present instance the casing 20 includes a thin tapered web 52 which covers the inner peripheral surface of the axial wall portion 36 as illustrated.

Thus, in assembling the parts of the bearing assembly, the balls 14 and cages C are assembled in the annular space 16 between the raceways R in the conventional manner. A supply of lubricant may be deposited in the annular space before assembly of the seals S. The seal S is then applied to cover the open axial ends of the annular space 16 to retain lubricant in the annular space 16. To this end, the outer diameter of the casing 20 is greater than the opening provided by the lip 13 so that when the seal is applied over the open axial end of the annular space, the casing 20 is slightly compressed radially inwardly and then snaps outwardly into the groove 22 to seat and seal with the outer ring 12. As illustrated, the inner face 21 of the casing 20 engages with the shoulder 17 to provide a surface to surface contact and an effective seal between the seal S and the outer ring 12. Further, in the assembled relation the feathered edge 24 of the casing presses lightly against an arcuately chamfered surface 54 adjacent the outer axial end of the inner ring 10. Thus in the assembled relation, the inner wall 32 of the lubricant retaining member 30 is spaced axially outwardly from the axial end wall 51 of the inner ring 10 and in the present instance, depends radially inwardly to a depth below a circular plane T through the outer peripheral surface of the inner ring. By this construction any lubricant which might tend to leak by the feathered edge 24 of the seal S during operation of the bearing, travels along the chamfered arcuate edge 54 and is thrown radially outwardly where it would be trapped or caught in the cup-like chamber 50. Thus where the bearing assembly is used in the apparatus where lubricant leakage to other components of the apparatus might be harmful, the seal of the present invention prevents such danger.

Even though the seal of the present invention is illustrated and described in connection with a double row angular contact bearing, it is of course to be understood that it can be applied to many other types of bearing assemblies.

While the particular embodiments of the present invention have been illustrated and described herein, it is not intended to limit the invention and changes and modifications may be made therein within the scope of the following claims.

We claim:
1. A bearing assembly comprising inner and outer rings, said outer ring having an inner circumferentially extending surface spaced from the outer peripheral surface of the inner ring to define an annular space therebetween, a plurality of rolling elements in said annular space, means defining a circumferential groove in the inner peripheral surface of the outer ring adjacent one axial end thereof, said inner ring having an arcuately chamfered circumferential surface underlying said groove in the outer ring, a seal detachably mountable adjacent an axial end of the annular space between the members comprising a ring-like casing having a rounded outer peripheral edge adapted to seat in said groove in the outer ring and a feathered radially inwardly directed portion having a tapered inner peripheral edge adapted to lightly engage the chamfered surface of the inner ring, a lubricant retaining member formed integrally with said casing comprising circumferentially extending offset inner and outer radial wall portions and an axial wall portion connecting the inner and outer radial wall portions, said outer radial wall portion embedded in said casing and said axial wall portion projecting from the outer face of said casing away from said annular space at approximately the midpoint of said casing, said casing including a thin tapered web covering the inner peripheral surface of said axial wall portion, said axial and inner radial wall portions and said feathered edge portion of said casing defining a cup-like circumferential chamber of generally U-shaped cross section, the open side of said chamber confronting and overlying the axial end wall of the inner ring and the inner circumferential edge of said inner radial wall portion projecting below a circular plane through the outer peripheral surface of the inner ring whereby lubricant which purges by the inner feathered edge of the casing and which is thrown radially outwardly upon relative rotation of the rings is deposited in said chamber.

2. A bearing assembly comprising inner and outer rings, said outer ring having an inner circumferentially extending surface spaced from the outer peripheral surface of the inner ring to define an annular space therebetween, a plurality of rolling elements in said annular space, means defining a circumferential groove in the inner peripheral surface of the outer ring adjacent opposite axial ends thereof, said inner ring having an arcuately chamfered circumferential surface at each axial end underlying said grooves in the outer ring, a seal detachably mountable adjacent each axial end of the annular space between the members, each seal comprising a ring-like casing having a rounded outer peripheral edge adapted to seat in said groove in the outer ring and a feathered radially inwardly directed portion having a tapered inner edge adapted to lightly engage the chamfered surface of the inner ring, a lubricant retaining member formed integrally with said casing comprising circumferentially extending offset inner and outer radial wall portions and an axial wall portion connecting the inner and outer radial wall portions, said outer radial wall portion embedded in said casing and said axial wall portion projecting from the outer face of said casing away from said annular space at approximately the midpoint of said casing, said casing including a thin tapered web covering the inner peripheral surface of said axial wall portion, said axial and inner radial wall portions and said feathered edge portion of said casing defining a cup-like circumferential chamber of generally U-shaped cross section, the open side of said chamber confronting and overlying the axial end wall of the inner ring and the inner circumferential edge of said inner radial wall portion projecting below a circular plane through the outer peripheral surface of the inner ring whereby lubricant which purges by the inner feathered edge of the casing and which is thrown radially outwardly upon relative rotation of the rings is deposited in said chamber.

References Cited by the Examiner

UNITED STATES PATENTS

| | | | |
|---|---|---|---|
| 1,917,987 | 7/1933 | Large | 308—187.2 |
| 1,917,988 | 7/1933 | Large | 308—187.2 |
| 2,003,906 | 6/1935 | Searles | 308—187.2 |
| 2,029,072 | 1/1936 | Hughes | 308—187.2 |
| 2,237,616 | 6/1941 | Smith | 308—187.2 |
| 2,723,869 | 11/1955 | Cobb | 277—94 |
| 2,945,707 | 7/1960 | Wasley | 277—95 X |
| 3,014,768 | 12/1961 | Dickinson | 308—187.2 |
| 3,245,735 | 4/1966 | Sikora | 308—187.1 |

FOREIGN PATENTS

| | | |
|---|---|---|
| 613,996 | 2/1956 | Canada. |
| 1,084,023 | 1/1955 | France. |

DAVID J. WILLIAMOWSKY, *Primary Examiner.*

L. L. JOHNSON, *Assistant Examiner.*